US012596455B2

(12) United States Patent (10) Patent No.: US 12,596,455 B2
Liu et al. (45) Date of Patent: Apr. 7, 2026

(54) CONTROL METHOD FOR A TOUCHPAD

(71) Applicant: ELAN MICROELECTRONICS CORPORATION, Hsinchu (TW)

(72) Inventors: Ying-Jie Liu, Zhubei City (TW); Hsueh-Wei Yang, Zhubei City (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 18/669,583

(22) Filed: May 21, 2024

(65) Prior Publication Data

US 2024/0402848 A1 Dec. 5, 2024

(30) Foreign Application Priority Data

May 30, 2023 (TW) .................................. 112120183

(51) Int. Cl.
 G06F 3/041 (2006.01)
 G06F 3/01 (2006.01)
 G06F 3/0354 (2013.01)
 G06F 3/038 (2013.01)
(52) U.S. Cl.
 CPC ............ G06F 3/0418 (2013.01); G06F 3/016 (2013.01); G06F 3/03547 (2013.01); G06F 3/038 (2013.01)

(58) Field of Classification Search
 None
 See application file for complete search history.

(56) References Cited

U.S. PATENT DOCUMENTS

| | | | |
|---|---|---|---|
| 2011/0080350 A1* | 4/2011 | Almalki ................ | G06F 3/0488 |
| | | | 345/173 |
| 2014/0160085 A1* | 6/2014 | Rabii .................... | G06F 3/0418 |
| | | | 345/178 |
| 2017/0315658 A1* | 11/2017 | Vandermeijden ... | G06F 3/04166 |
| 2020/0356209 A1* | 11/2020 | Yang ........................ | G06N 3/08 |
| 2021/0011574 A1* | 1/2021 | Micci .................... | G06F 3/0418 |

* cited by examiner

*Primary Examiner* — Stephen T. Reed
(74) *Attorney, Agent, or Firm* — patenttm.us

(57) ABSTRACT

A control method for a touchpad is provided. When a vibration unit is driven, the touchpad enters a touch function restriction mode so that the touchpad undergoes various different controls compared to the normal mode. This helps to avoid erroneous capacitive sensing caused by the driving of the vibration unit, preventing determinations in touch operations and avoiding the accidental triggering of commands or gestures. As a result, it reduces or minimizes the influences on user operations.

21 Claims, 4 Drawing Sheets

<u>10</u>

CONTROL METHOD FOR A TOUCHPAD

CROSS-REFERENCE TO RELATED APPLICATIONS

This application is based upon and claims priority under 35 U.S.C. 119 from Taiwan Patent Application No. 112120183 filed on May 30, 2023, which is hereby specifically incorporated herein by this reference thereto.

BACKGROUND OF THE INVENTION

1. Field of the Invention

The present invention relates to a control method for a touchpad, especially a control method for a touchpad that avoids interference from vibration noise on touch signals.

2. Description of the Prior Arts

Touchpads are currently widely used in various portable electronic devices as input devices. When users touch the surface of the touchpad with a touch object (such as a finger, stylus, etc.), a coupling capacitance is generated between the contact point of the touch object and the sensing electrodes located in relative positions on the touchpad. This coupling capacitance generates a capacitive sensing value, which is used to determine the position information of the contact point and obtain other information, such as the trajectory of the touch object's movement, triggering corresponding touch commands or gestures.

To enhance user experience, some conventional touchpads incorporate haptic feedback. This means that after performing certain actions or gestures on the touchpad, the built-in vibration unit (such as a motor) is activated to produce vibration. As a result, the touch object on the touchpad feels the vibration, providing immediate feedback that the touch command or gesture has been successfully transmitted. For example, in touchpads capable of detecting force-sensing information, normal touch actions (e.g., clicking) are triggered under normal pressure. However, special commands (e.g., changing desktop wallpaper) are activated when the applied pressure exceeds a threshold. Providing haptic feedback immediately when the pressure exceeds the threshold allows users to know that a special command has been successfully triggered at the moment of interaction.

However, when the vibration unit is activated, the signal used by the control unit to drive the vibration unit may potentially couple with the sensing electrodes, or the vibration action itself may cause coupling capacitance between the multiple layers of the touchpad's structure. This erroneous capacitance sensing value may lead to the control unit incorrectly determining the position of the touch object, thereby triggering incorrect commands or gestures, causing inconvenience to the user.

SUMMARY

To overcome the shortcomings, the present invention provides a control method for a touchpad to ensure that the determination of touch information from the touch object is not affected when the vibration unit is activated.

To achieve the aforementioned objectives, the present invention provides a control method for a touchpad, wherein the touchpad has a main body and a vibration unit, and the control method comprises steps of: executing a touch function restriction mode when the vibration unit is driven to vibrate the main body; and terminating executing the touch function restriction mode when the touch function restriction mode continues until a specific condition is met.

The advantage of the present invention lies in the execution of the touch function restriction mode, which limits the touch sensitivity of the touchpad to avoid the influence of capacitance sensing inadvertently generated by the driving of the vibration unit on the touchpad's determination of touch object information.

Other objectives, advantages and novel features of the invention will become more apparent from the following detailed description when taken in conjunction with the accompanying drawings.

DETAILED DESCRIPTION OF THE EMBODIMENTS

Figure 1:
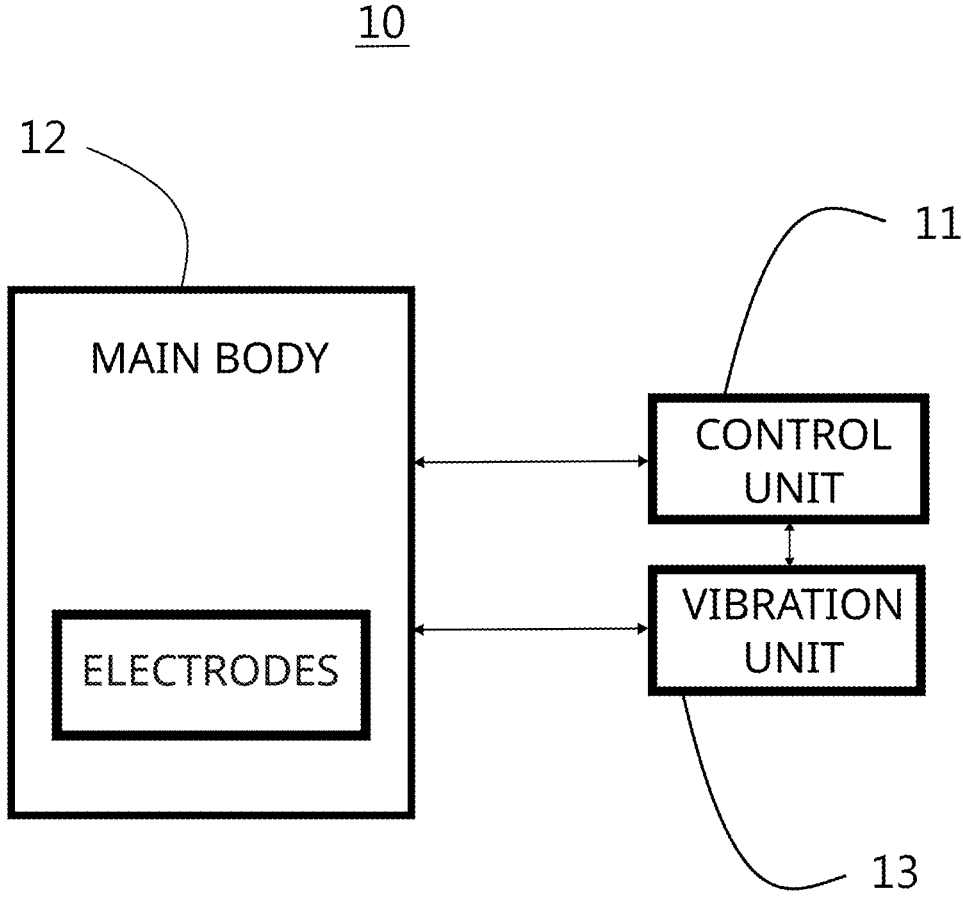
FIG. 1 is a schematic diagram of a touchpad module.

A control method in accordance with the present invention is used for a touchpad (as shown in FIG. 1), wherein the touchpad 10 comprises a control unit 11, a main body 12 with multiple electrodes, and a vibration unit 13. The control unit 11 is electrically connected to the vibration unit 13 to drive the vibration unit 13 to generate vibration. The control unit drives the electrodes and senses signals from the electrodes. The control method in accordance with the present invention involves executing a touch function restriction mode within a specific time period when the vibration unit 13 is driven to vibrate the main body 12. When the touch function restriction mode is executed for a specific time period, the execution of the touch function restriction mode ceases.

Figure 2:
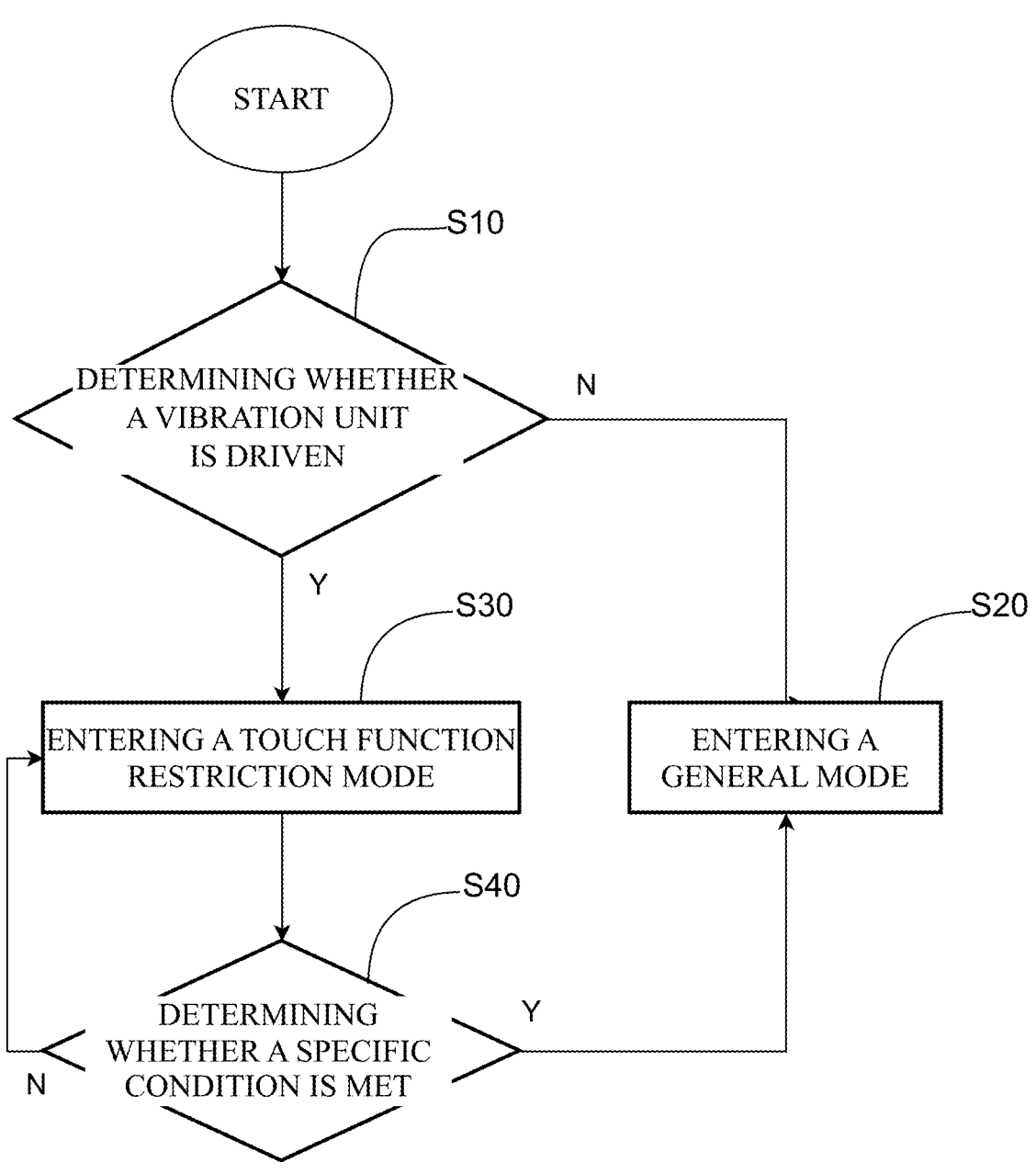
FIG. 2 is a flowchart of a control method in accordance with the present invention.
Figure 3:
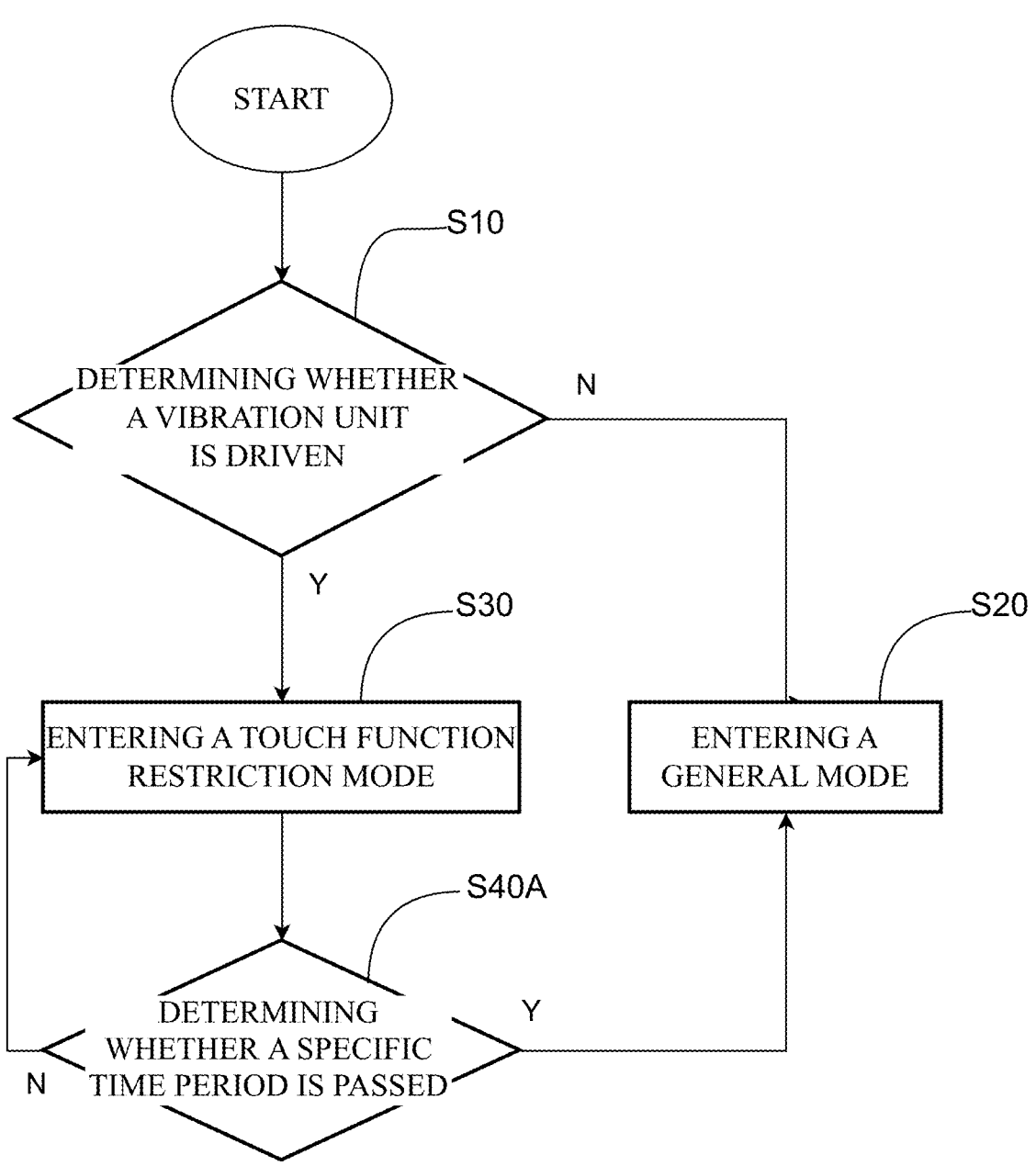
FIG. 3 is a flowchart of another embodiment of a control method in accordance with the present invention.

In one embodiment, as shown in FIG. 2, a control method in accordance with the present invention includes the following steps: determining whether the vibration unit is driven (S10), if not, maintaining a normal mode of touch function (S20), if yes, executing a touch function restriction mode (S30); then, determining whether a specific condition is met (S40), if yes, returning to the normal mode of touch function (S20), if not, continuing to execute the touch function restriction mode (S30). The setting of the specific condition corresponds to the scenario where the capacitance sensing value generated by the touchpad is affected after the vibration unit is driven. Furthermore, as illustrated in FIG. 3, determining the specific condition involves determining whether a specific time period is passed (S40A).

The touch function restriction mode restricts certain functions of the general touch function, thereby preventing the capacitance sensing value generated by the driven vibration unit from affecting the touchpad's determination of touch information from the touch object. The touch function restriction mode may include various forms but is not limited to the following examples.

Example 1

In the touch function restriction mode, a threshold for entering a noise mode is adjusted to reduce the probability of entering the noise mode. Typically, the touchpad determines the presence of a touch object by comparing the capacitance sensing value at a specific position to a predefined threshold. When the capacitance sensing value exceeds the predefined threshold, the touchpad identifies the presence of the touch object at that specific position. However, when the touchpad receives excessive noise interference (such as power or floating noise), it defaults to a threshold for entering the noise mode. Once this threshold is exceeded, the touchpad enters the noise mode, where the frame rate of the touchpad is reduced and/or the reception of multi-touch events is stopped. During touch sensing on the touchpad, the electrodes are driven and the sensing signals are received at a fixed frame rate. For example, a frame rate of 240 Hz means that the touchpad completes driving and receiving signals from all sensing electrodes 240 times per second. Reducing the frame rate decreases the frequency of driving and receiving signals, elongating the interval between each driving and receiving cycle. When the vibration unit is driven, the erroneously coupled capacitance sensing value may easily exceed the threshold for entering the noise mode, causing the touchpad to enter the noise mode directly. It results in noticeable delays or disruptions in the user's interaction experience. Therefore, in this embodiment, the threshold for entering the noise mode is increased when entering the touch function restriction mode, making it more difficult for the touchpad to enter the noise mode.

Example 2

In the touch function restriction mode, no determination is made to generate new touch objects or change the type of existing touch objects. To prevent the capacitance sensing value generated by driving the vibration unit from being mistakenly interpreted as a new touch object or changing the type of already identified touch objects, the generation of new touch objects is stopped, or the type of existing touch objects is not altered. Here, "new touch objects" refer to fingers or stylus that are identified as touch objects before entering the touch function restriction mode, and "changing the type of existing touch objects" refers to altering the type of touch objects previously identified as fingers or stylus, such as changing them to palms. Therefore, in the touch function restriction mode, the touchpad continues to operate or make relevant touch judgments based only on the touch objects sensed and identified as existing touch objects in the normal mode of the touch function. In one embodiment, not determining the generation of new touch objects or not changing the type of existing touch objects means not identifying another new touch object based on capacitance sensing values or not altering the type of touch objects previously identified based on capacitance sensing values. Furthermore, to avoid mistakenly triggering multi-touch events due to the capacitance sensing value generated by driving the vibration unit being erroneously combined with the capacitance sensing value of the actual touch object and forming a multi-touch gesture, the touch function restriction mode in this embodiment may also stop receiving triggers for multi-touch events to reduce the probability of inadvertently triggering multi-touch events.

Example 3

Before entering the touch function restriction mode, the touch objects already identified as present on the touchpad in the normal mode of touch function are considered. In the touch function restriction mode, a displacement value of the touch object obtained based on capacitance sensing values is adjusted to a restricted displacement amount. Since the capacitance sensing value generated by driving the vibration unit may be mistakenly interpreted as position information indicating that the touch object moves to a new position, in the touch function restriction mode, the displacement of the touch object determined after entering the restriction mode is reduced to the aforementioned restricted displacement amount. This helps reduce the displacement erroneously determined as a drastic movement due to the erroneous capacitance sensing value. In one embodiment, the restricted displacement amount is calculated based on the capacitance sensing value of the touch object. The displacement value is obtained from the capacitance sensing value divided by a position parameter value greater than 1. For example, if the calculated displacement value is 5 units in the touch function restriction mode, dividing this value by a default position parameter value of 2 yields a restricted displacement amount of 2.5 units.

Example 4

In the touch function restriction mode, the touch objects suspected to be water are not determined as water. Typically, to prevent accidental touch caused by water contact on the touchpad surface, the touchpad determines whether water is based on the distribution of capacitance sensing values. If the capacitance sensing values detected within a very short time are determined as water, the system enters a default waterproof mode, restricting operations to single-touch or lowering the frame rate. This may affect the user's operation experience and smoothness. However, since the capacitance sensing values generated by driving the vibration unit may resemble those of water, the touchpad may mistakenly classify them as water and enter the waterproof mode. Therefore, in this embodiment, the touch function restriction mode forcefully determines that the capacitance sensing value distribution detected is not water to avoid mistakenly entering the waterproof mode and affecting the user experience.

Example 5

In the touch function restriction mode, no determination is made on the force-sensing points or values detected. When the vibration unit is driven to vibrate, the force sensing values detected by the force sensing unit used to detect force may be affected, resulting in rapid and drastic changes in force calculated by the touchpad's firmware, leading to firmware misinterpretation. If the driving condition of the vibration unit is such that the detected force value exceeds a threshold, the misinterpreted force will cause the vibration unit to vibrate continuously. Therefore, in the touch function restriction mode, the firmware does not make judgments on force-related information to avoid obtaining misinterpreted force information.

Figure 4:
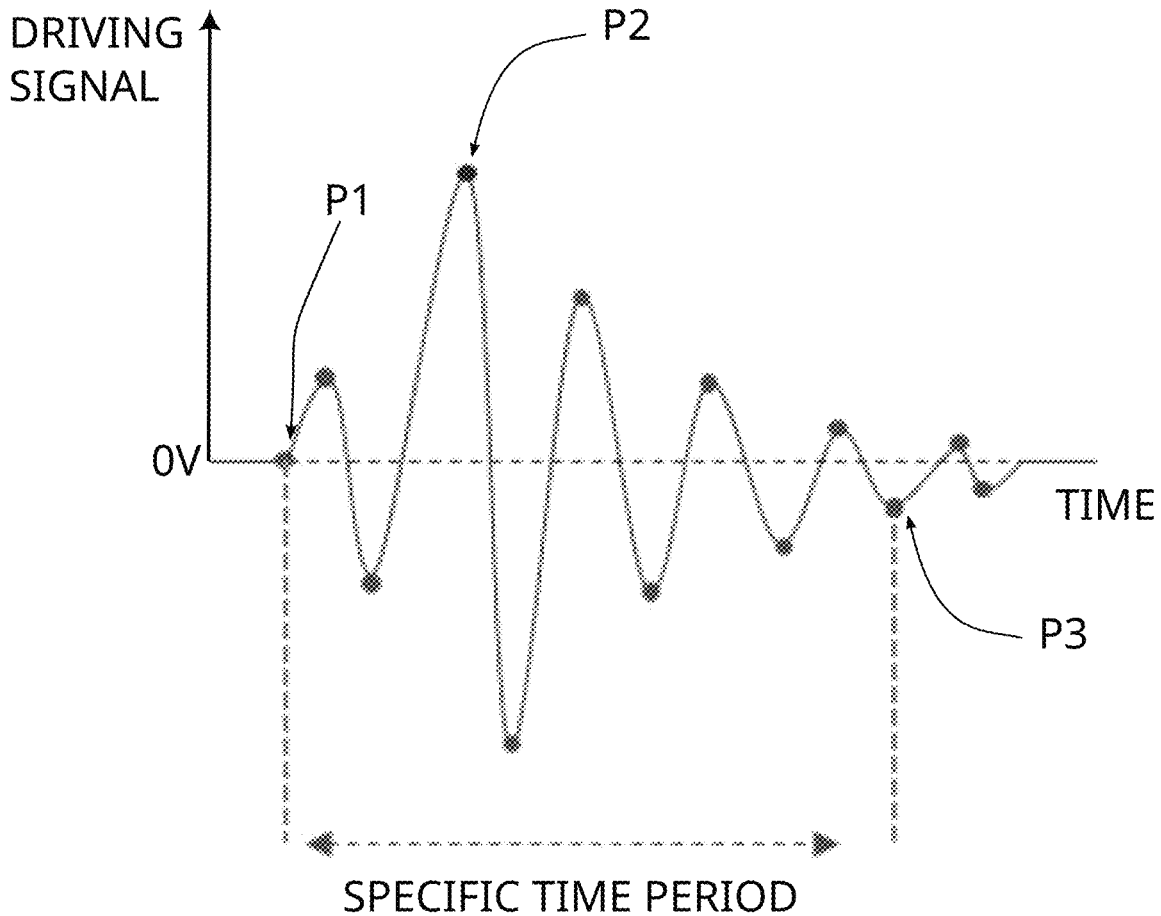
FIG. 4 is a line chart of the vibration amplitude of the touchpad.

In one embodiment, the specific time period has a predefined starting point and an ending point. The starting point may be when the control unit begins sending a driving signal to the vibration unit or when the vibration unit starts vibrating. The ending point may be when the control unit stops sending the driving signal to the vibration unit or when the vibration unit stops vibrating. In one embodiment, the timing of starting and stopping the vibration is shown in FIG. 4. The main body of the touchpad begins vibrating at time point P1, which serves as the starting point. The maximum amplitude occurs at time point P2. When the amplitude decreases below a termination threshold at time point P3, it is determined as the time to stop vibrating. Thus, time point P3 serves as the ending point. In this implementation, the termination threshold is set to $\frac{1}{10}$ of the maximum amplitude, but this is not limited. The termination threshold May be any other value greater than or equal to 0.

The vibration unit may be driven under different circumstances. In one embodiment, the vibration unit is driven when a touch object triggers a click event on the touchpad. In another embodiment, the vibration unit is driven when the touchpad receives a driving command sent by the operating system.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A control method for a touchpad, wherein the touchpad has a control unit, a main body and a vibration unit, wherein the main body has multiple electrodes electrically connecting to the control unit, the control unit drives the electrodes and senses signals from the electrodes, and the control method comprises steps of:

executing a touch function restriction mode when the vibration unit is driven to vibrate the main body; and terminating executing the touch function restriction mode when the touch function restriction mode continues until a specific condition is met.

2. The control method as claimed in claim 1, wherein meeting the specific condition means that the touch function restriction mode is executed for a specific time period, wherein a starting point of the specific time period refers to the time when the control unit begins transmitting a driving signal to the vibration unit, and an ending point of the specific time period refers to the time when the control unit stops transmitting the driving signal to the vibration unit.

3. The control method as claimed in claim 1, wherein meeting the specific condition means that the touch function restriction mode is executed for a specific time period, wherein a starting point of the specific time period refers to the time when the control unit drives the vibration unit to vibrate, and an ending point of the specific time period refers to the time when the vibration unit stops vibrating.

4. The control method as claimed in claim 3, wherein the time when the vibration unit stops vibrating refers to when an amplitude of the touchpad's main body is less than $\frac{1}{10}$ of a maximum amplitude.

5. The control method as claimed in claim 1, wherein the vibration unit is driven to vibrate the main body when a click event on the touchpad is triggered or when the touchpad receives a driving command.

6. The control method as claimed in claim 2, wherein the vibration unit is driven to vibrate the main body when a click event on the touchpad is triggered or when the touchpad receives a driving command.

7. The control method as claimed in claim 3, wherein the vibration unit is driven to vibrate the main body when a click event on the touchpad is triggered or when the touchpad receives a driving command.

8. The control method as claimed in claim 1, wherein in the touch function restriction mode, a threshold for entering a noise mode is adjusted to reduce the probability of entering the noise mode.

9. The control method as claimed in claim 2, wherein in the touch function restriction mode, a threshold for entering a noise mode is adjusted to reduce the probability of entering the noise mode.

10. The control method as claimed in claim 3, wherein in the touch function restriction mode, a threshold for entering a noise mode is adjusted to reduce the probability of entering the noise mode.

11. The control method as claimed in claim 8, wherein in the noise mode, a frame rate of the touchpad is reduced and/or a reception of multi-touch events is stopped.

12. The control method as claimed in claim 1, wherein in the touch function restriction mode, no determination is made to generate a new touch object or change the type of existing touch object on the touchpad.

13. The control method as claimed in claim 2, wherein in the touch function restriction mode, no determination is made to generate a new touch object or change the type of existing touch object on the touchpad.

14. The control method as claimed in claim 3, wherein in the touch function restriction mode, no determination is made to generate a new touch object or change the type of existing touch object on the touchpad.

15. The control method as claimed in claim 12, wherein
  the said no determination of generating the new touch object or changing the type of touch object on the touchpad refers to not determining a new touch object or changing the type of touch object based on capacitance sensing values detected on the touchpad; and
  the new touch object refers to a touch object that is not identified before entering the touch function restriction mode.

16. The control method as claimed in claim 1, wherein for touch object already identified as present on the touchpad before entering the touch function restriction mode, a displacement value of the touch object obtained based on capacitance sensing values is adjusted to a restricted displacement amount in the touch function restriction mode.

17. The control method as claimed in claim 2, wherein for touch objects already identified as present on the touchpad before entering the touch function restriction mode, a displacement value of the touch object obtained based on capacitance sensing values is adjusted to a restricted displacement amount in the touch function restriction mode.

18. The control method as claimed in claim 3, wherein for touch objects already identified as present on the touchpad before entering the touch function restriction mode, a displacement value of the touch object obtained based on capacitance sensing values is adjusted to a restricted displacement amount in the touch function restriction mode.

19. The control method as claimed in claim 16, wherein the displacement distance value is obtained from the capacitance sensing value divided by a position parameter value greater than 1.

20. The control method as claimed in claim 1, wherein in the touch function restriction mode, a touch object on the touchpad suspected to be water are not determined as water.

21. The control method as claimed in claim 1, wherein in the touch function restriction mode, no determination is made to the force-sensing information on the touchpad.

* * * * *